Oct. 13, 1925.

A. M. CAPRA

WATER FILTER

Filed Sept. 3, 1924

1,556,913

Angelo M. Capra, Inventor

By Clarence A. O'Brien
Attorney

Patented Oct. 13, 1925.

1,556,913

UNITED STATES PATENT OFFICE.

ANGELO MARIO CAPRA, OF PHILADELPHIA, PENNSYLVANIA, ASSIGNOR TO FEDELE DE PALMA, OF PHILADELPHIA, PENNSYLVANIA.

WATER FILTER.

Application filed September 3, 1924. Serial No. 735,619.

*To all whom it may concern:*

Be it known that I, ANGELO M. CAPRA, a citizen of the United States, residing at Philadelphia, in the county of Philadelphia and State of Pennsylvania, have invented certain new and useful Improvements in a Water Filter, of which the following is a specification.

This invention relates to an improved water filtering device which I have devised for use more particularly in the water filtering system disclosed in a pending application filed by me on June 9, 1924, and bearing Serial Number 718,946.

Briefly, the pending application discloses a system including primary and secondary chambers formed by specially designed casings. Contained in the primary chamber is a single filter basket, and contained in the secondary chamber is a plurality of superposed filter baskets, these superposed baskets being of different sizes and containing properly graduated filtering material for effectively filtering the water passing therethrough.

The present improvement is directed more particularly to that casing employed for containing the plurality of filter baskets. For instance, instead of seating the baskets one on top of the other in contact with each other, I now propose to arrange them in spaced superposed relation and to support them from ledges contained in an inner compartment formed by a surrounding wall spaced from the wall of the casing proper.

It follows that it is also a distinction to provide the large sediment collecting pockets between the supplemental wall and the wall of the casing. Another advantage is that the filter baskets are themselves especially constructed to aid in the straining operation, each basket being provided with an individual handle to facilitate its removal when it is desired to replace the filtering material contained in the baskets.

In the accompanying drawing:—

Figure 1:
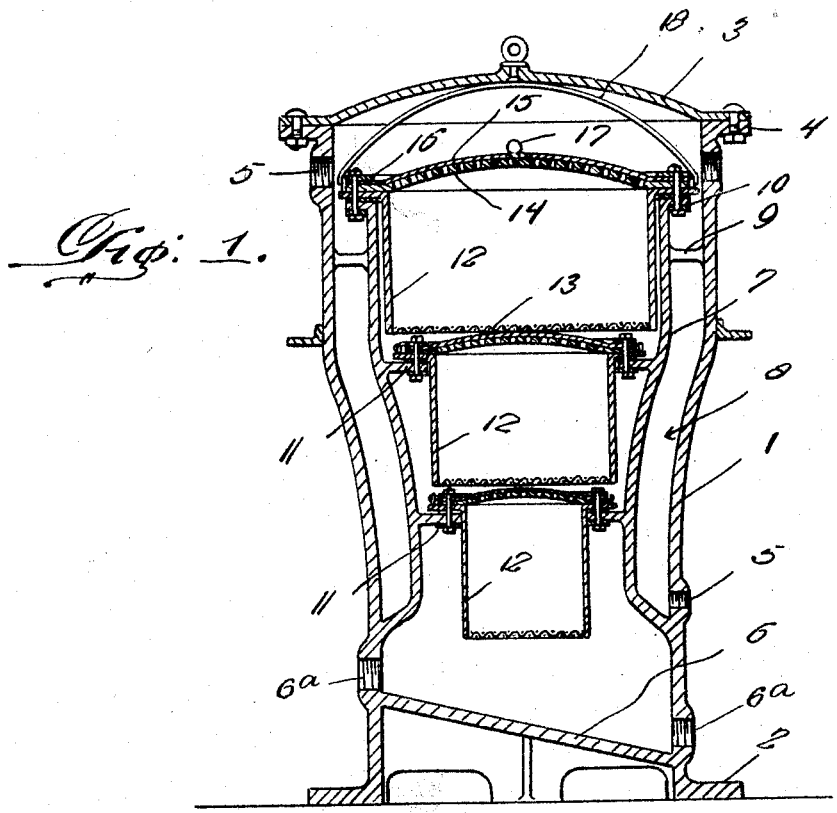
Figure 1 is a central vertical section through the water filtering device constructed in accordance with the invention.
Figure 2:
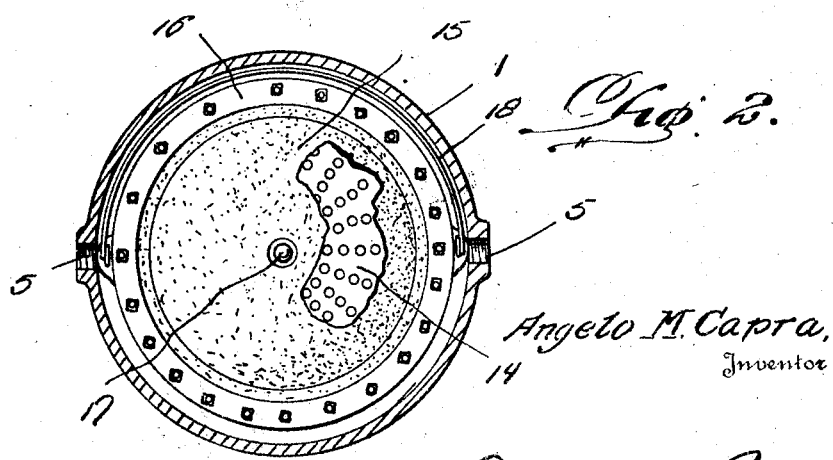
Figure 2 is a horizontal section with a portion of one of the filter baskets broken away to disclose the cover construction.

In the drawing wherein like reference characters designate like parts throughout the same, 1 designates generally the vertically elongated casing provided with suitably designed base 2, a removable closure 3 fastened to an attaching flange at the top, and threaded holes 5 in which appropriate fluid circulating pipes are adapted to be tapped.

Arranged within the casing is an inclined bottom 6, adjacent which are screwthreaded holes 6ª for appropriate pipes (not shown). One of these pipes may be said to be the drain pipe, that one being located at the lowest end of the inclined bottom. The other pipe may constitute a means for supplying water to be utilized for flushing the surface of the inclined bottom. Undoubtedly some sediment will collect upon the surface of the bottom and the presence of this flushing means will be found advantageous. Just above this bottom and formed integral with the wall of the casing is a supplemental wall 7 which rises in spaced relation from the casing wall to form a compartment or pocket 8 in which sediment is collected. If desired, small reinforcing arms 9 may be provided between the walls and the top. It is to be observed that the partition wall 7 extends nearly to the top of the casing and at its upper end it is provided with an outwardly directed lateral flange 10. On its interior and below the top it is formed with superposed flanges 11 forming supporting ledges. These flanges 10 and 11 constitute a support for superposed filter baskets 12. As in the pending case, these baskets are graduated in size from top to bottom and in practice they will contain suitable minerals, charcoal or the like for removing the impurities from the liquid. The grade of filtering material will range from coarse to fine from the upper to the lower baskets.

As before stated, the filtering baskets in the present instance are of special construction. Inasmuch as each basket is identical, the description will appear in the singular. To this end, each basket is provided at its bottom with a strainer or screen 13. At its top is an apertured concavo-convex covering resting on and bolted or otherwise detachably fastened to the coacting supporting ledge. Packing may be arranged in between the ledges and flange of the basket. Stretched tautly over the cover 14 is a piece of fabric 15 of desired texture. The fabric is secured in place by the bolts already referred to, and if desired a retaining ring 16 may be employed. To facilitate removal of the cover, it may be equipped with a knob 17 and to facilitate removal of the basket, it may be equipped with a handle or bail 18.

Having thus described the invention, what I claim is:—

1. In a filtering device of the class described, a basket for containing filtering material, said basket being provided at its bottom with a screen and at its top with a lateral supporting flange, a handle hingedly connected to said flange, an apertured cover resting upon said flange, filtering fabrics stretched across said cover and closing the apertures therein, and clamping means for said fabric and cover.

2. In a filtering device of the class described, a casing having an inclined bottom adjacent which are screw threaded openings, a supplemental annular wall arranged within said casing and connected around its entire lower end to the wall of the casing and extending upwardly in spaced relation to the casing wall to form a closed bottom sediment collecting pocket between said walls, said supplemental wall having its upper end directed laterally to provide a flange, and being formed at vertically spaced points on its interior with additional flanges forming supporting ledges, and flanged filtering members arranged within said supplemental wall and having their flanges resting on the first named flanges.

In testimony whereof I affix my signature.

ANGELO MARIO CAPRA.